(12) United States Patent
Chowdhury et al.

(10) Patent No.: US 7,497,948 B2
(45) Date of Patent: Mar. 3, 2009

(54) METHOD FOR REMEDIATION OF SOIL AND GROUNDWATER

(75) Inventors: Ajit K. Chowdhury, Madison, WI (US); Jack W. Anderson, Prairie du Sac, WI (US)

(73) Assignee: RMT, Inc., Madison, WI (US)

( * ) Notice: Subject to any disclaimer, the term of this patent is extended or adjusted under 35 U.S.C. 154(b) by 183 days.

(21) Appl. No.: 11/257,659

(22) Filed: Oct. 25, 2005

(65) Prior Publication Data

US 2006/0086663 A1 Apr. 27, 2006

Related U.S. Application Data

(60) Provisional application No. 60/621,757, filed on Oct. 25, 2004.

(51) Int. Cl.
*C02F 3/00* (2006.01)
(52) U.S. Cl. .................. 210/610; 210/620; 210/630

(58) Field of Classification Search ............. 210/610, 210/620, 630, 220
See application file for complete search history.

(56) References Cited

U.S. PATENT DOCUMENTS

| 5,954,963 | A * | 9/1999 | Matheson | 210/606 |
| 7,163,632 | B1 * | 1/2007 | Speece | 210/621 |
| 2004/0113288 | A1 * | 6/2004 | Korzeniowski | 261/76 |
| 2005/0189277 | A1 * | 9/2005 | McGrath et al. | 210/175 |
| 2007/0221573 | A2 * | 9/2007 | Mailath et al. | 210/610 |

* cited by examiner

*Primary Examiner*—Chester T Barry
(74) *Attorney, Agent, or Firm*—Quarles & Brady LLP

(57) ABSTRACT

A system and method to treat a site includes oxygenating or ozonating the site, adding nutrients, and maintaining a low bio-chemical-oxygen-demand-to-total-kjeldahl-nitrogen (BOD5:TKN) ratio. Furthermore, the system and method maintain conditions effective to permit aerobic biological deamination of organic-nitrogen compounds and nitrification of ammonia-nitrogen compounds.

14 Claims, 4 Drawing Sheets

METHOD FOR REMEDIATION OF SOIL AND GROUNDWATER

CROSS-REFERENCE TO RELATED APPLICATIONS

This application claims the benefit of U.S. Provisional Patent Application Ser. No. 60/621,757, filed Oct. 25, 2004, and entitled "IN-SITU REMEDIATION OF NITROGEN COMPOUNDS IN SOIL AND GROUNDWATER."

STATEMENT REGARDING FEDERALLY SPONSORED RESEARCH OR DEVELOPMENT

Not applicable.

BACKGROUND OF THE INVENTION

The present invention relates generally to a system and method for remediation of soil and groundwater and, more particularly, to a system and method for nitrification/denitrification of groundwater to remove undesirable elements from soil and groundwater.

Disposal practices and handling of nitrogen compounds in industrial and agricultural operations often give rise to undesirable elements in soil and groundwater. In particular, it is possible for soil and groundwater to contain various forms of nitrogen contaminants that require remediation.

When in the environment, organic nitrogen slowly converts to ammonia-N and, in turn, further converts to highly mobile nitrate-N. Accordingly, nitrate contamination of groundwater often exceeds the U.S. Environmental Protection Agency (USEPA) drinking water maximum contaminate level (MCL) of 10 mg (as N)/L. This problem is compounded by the fact that nitrate contamination has been linked to the potential formation of nitroso-compounds in the environment, which are known carcinogens. Therefore, remediation of nitrogen compounds to reduce the potential presence of nitrates in groundwater is desirable to treat contaminated sites and protect clean groundwater supplies.

In the wastewater industry, the reduction/destruction of nitrogen compounds often include physico-chemical processes such as air stripping, breakpoint chlorination, ion exchange, or the like. However, these physico-chemical nitrogen treatment processes have often been found to be either ineffective or inefficient for destroying the various form of nitrogen, particularly under subsurface conditions.

For example, processes that use air stripping to remove contaminants from groundwater are ineffective at removing various nitrogen compounds. That is, while air stripping processes have been successful in reducing some contaminants, such processes are only effective for the removal of volatile compounds and, thus, cannot remove various nitrogen compounds.

Additionally, biological nitrification and denitrification processes have been utilized with some success. These biological processes generally work well in above-ground settings because they require a very specialized process condition for effective treatment. On the other hand, in the subsurface environment, the biological process of nitrification-denitrification is extremely slow because the prevailing conditions are far from ideal for the essential microorganisms to thrive.

As such, some systems have been developed that utilize a phosphorus source, such as polyphosphates and trimetaphosphates that encourage indigenous microbes to anaerobically convert nitrate into nitrogen gas within a groundwater source. While such biodenitrification processes can be performed in situ, they are only capable of attacking and reducing nitrates. Therefore, such processes are ineffective at reducing various nitrogen compounds.

Therefore, it would be desirable to have a system and method for the remediation of a variety of forms of nitrogen compounds as well as nitrates in soil or groundwater.

BRIEF SUMMARY OF THE INVENTION

The present invention overcomes the aforementioned drawbacks by providing a system and method for effective biological reduction of various forms of nitrogen compounds in soil or groundwater. The invention is capable of converting a wide variety of nitrogen forms to harmless elemental nitrogen, thereby reducing nitrogen pollutants in groundwater and surrounding soils.

A groundwater remediation system is disclosed that includes a well providing access through a water table to an aquifer and a pump disposed within the well to extract groundwater from the aquifer. An eductor receives the groundwater and mixes it with an oxidizing gas. A release path delivers the groundwater and oxidizing gas to the aquifer to nitrificate the groundwater in the aquifer. An injection path delivers an oxygen scavenger and an electron donor into the groundwater in the aquifer to denitrficate the groundwater in the aquifer.

A treatment process using this system generally includes the steps of oxygenating or ozonating the source area, adding nutrients, and maintaining a low bio-chemical-oxygen-demand-to-total-kjeldahl-nitrogen (BOD5-to-TKN or BOD5:TKN) ratio. Accordingly, the process creates conditions effective to permit aerobic biological deamination of organic-nitrogen compounds and nitrification of ammonia-nitrogen compounds.

Various other features and advantages of the present invention will be made apparent from the following detailed description, the drawings and the claims.

DETAILED DESCRIPTION OF THE PREFERRED EMBODIMENT

Figure 1:
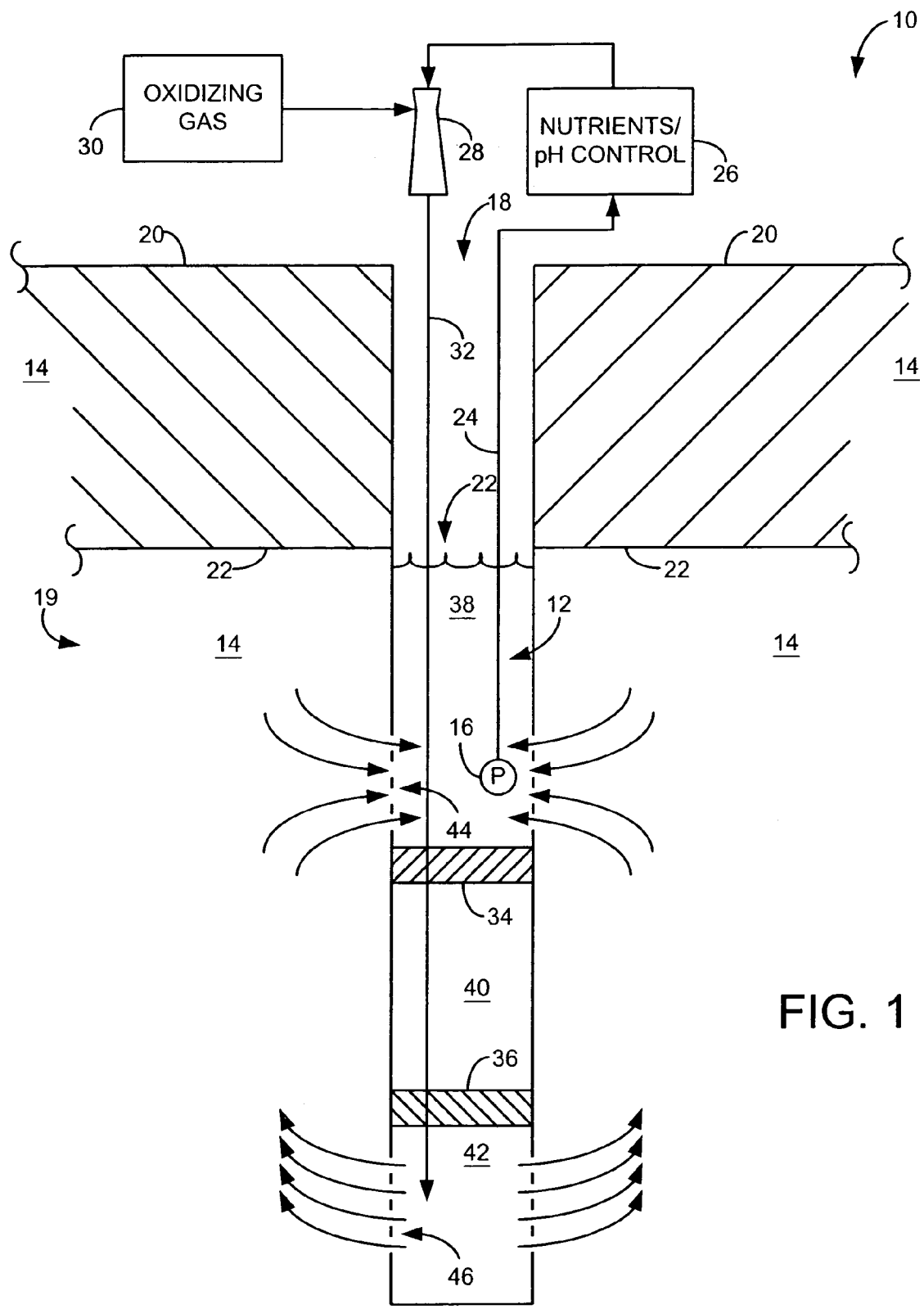
FIG. 1 is a cross-sectional view of a system for remediation of groundwater and surrounding soils in accordance with one aspect of the present invention.

Referring to FIG. 1, a remediation system 10 for treating groundwater 12 and surrounding soil 14 includes a submergible pump 16 disposed in a well 18 accessing an aquifer 19. The well 18 is cut into a ground surface 20 and extends below a water level 22. A supply pipe 24 extends from the pump 16 to a nutrient supply 26 and eductor, in particular, a venturi eductor 28. The system 10 also includes an oxidizing gas supply 30 and a return pipe 32 that extends down the well 18 and through a first packer 34 and a second packer 36. As such, an upper well 38 is created that is divided by the first packer 34, a layer of soil 40, and the second packer 36 from a lower well 42. Within the upper well 38 and the lower well 42 are screens 44, 46, respectively. In this regard, as will be described, groundwater 12 is drawn through the screen 44 of the upper well 38 and pushed through the screen 46 of the lower well 42.

As will be described, the remediation system 10 is configured to treat the groundwater 12 by reducing the amount of undesirable nitrogen compounds in the groundwater 12. In operation, the system 10 draws groundwater 12 via the pump 16 from the upper well 38. The groundwater 12 is pushed up the supply pipe 24. Once above ground surface 20, nutrients may be added from the nutrient source 26. The groundwater 12 is then pumped to the venturi eductor 28 where oxidizing gas is injected from the oxidizing gas source 30 and the groundwater 12 is returned below the ground surface 20 to the lower well 42 where it can disperse through the screen 46 into the soil 14. As will be described, groundwater is used as the motive fluid for venturi eductor 28.

Figure 2:
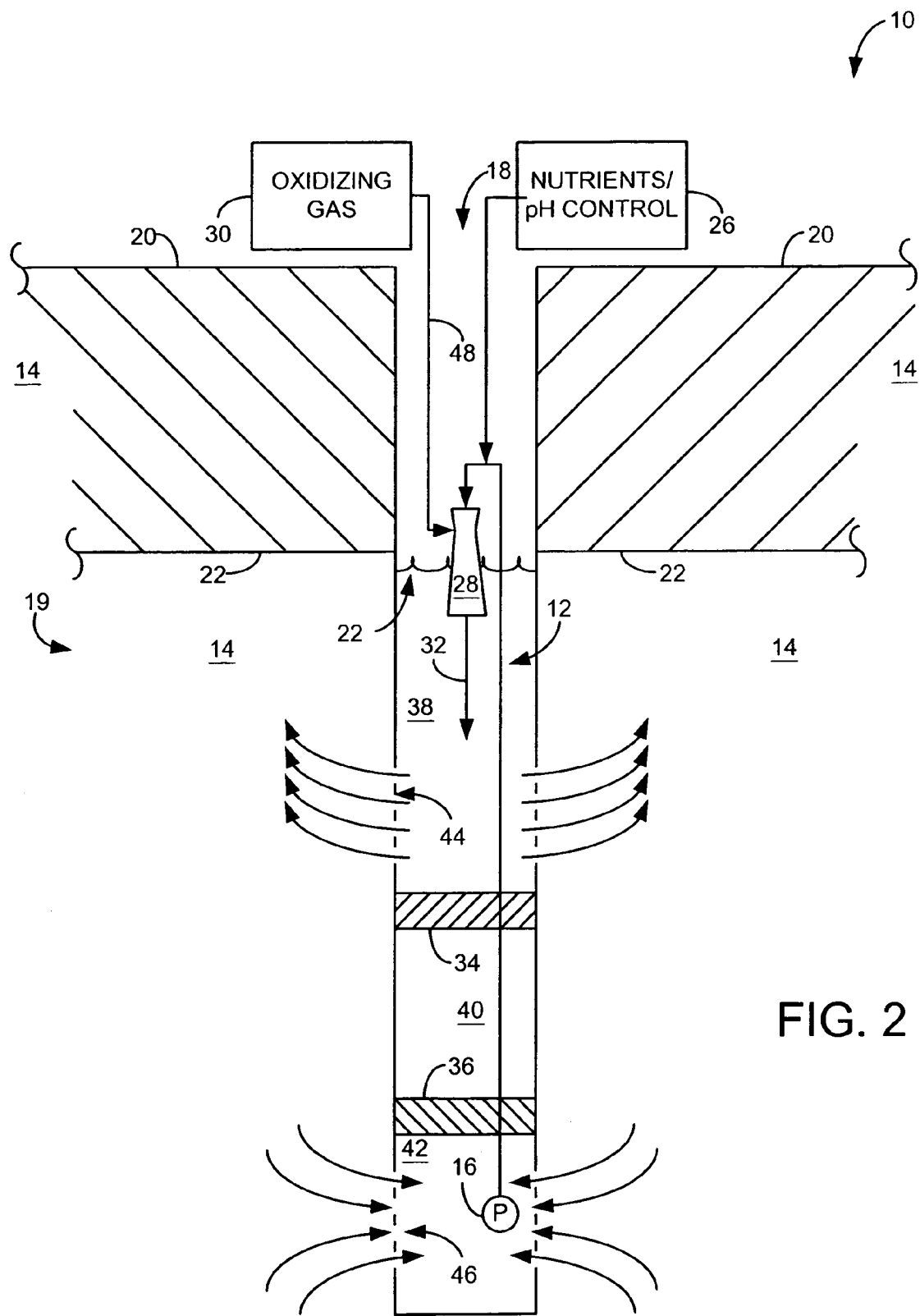
FIG. 2 is a cross-sectional view of a system for remediation of groundwater and surrounding soils in accordance with another aspect of the present invention.

Alternatively, referring now to FIG. 2, it is contemplated that the system may be substantially subterranean, whereby the entire treatment process occurs under the ground surface 20. In particular, the venturi eductor 28 may be disposed within the well 18. That is, the venturi eductor 28 may be placed below or near the water table 22 or near the point of discharge from the return pipe 32 using a pipe 58 that connects the source of the oxidizing gas 30 to the throat of the venturi eductor 28. Accordingly, the only components that will be positioned above ground are the oxidizing gas source 30 and the nutrient supply 26, but these also may be disposed below the ground 20 with little more than an access port (not shown) provided in order to replenish the supply of oxidizing gas 30 and/or nutrients. In this regard, the entire remediation system 10 may be disposed substantially under the ground surface 20 such that all treatment operations occur under the ground surface 20 and, more specifically, in-situ.

As an additional alternative to the configuration described with respect to FIG. 1, the functions of the upper well 38 and the lower well 42 may be reversed. That is, the pump 16 may be arranged to draw from the lower well 42, and return pipe 32 may be arranged to deliver groundwater 12 back to the upper well 38. However, it should be recognized that the specific arrangements and functions performed with respect to the upper well 38 and the lower well 42 will generally be selected based on the specifics of the treatment plan and the environment surrounding the remediation system 10.

Additionally, while FIGS. 1 and 2 have been described with respect to a single well 18 that is used for extraction and reinjection of groundwater, it is contemplated that the groundwater may be extracted from a different location than where it is reinjected. In this regard, separate wells may be used for groundwater extraction and reinjection. Additionally or alternatively, water from an external source can also be used.

Figure 3:
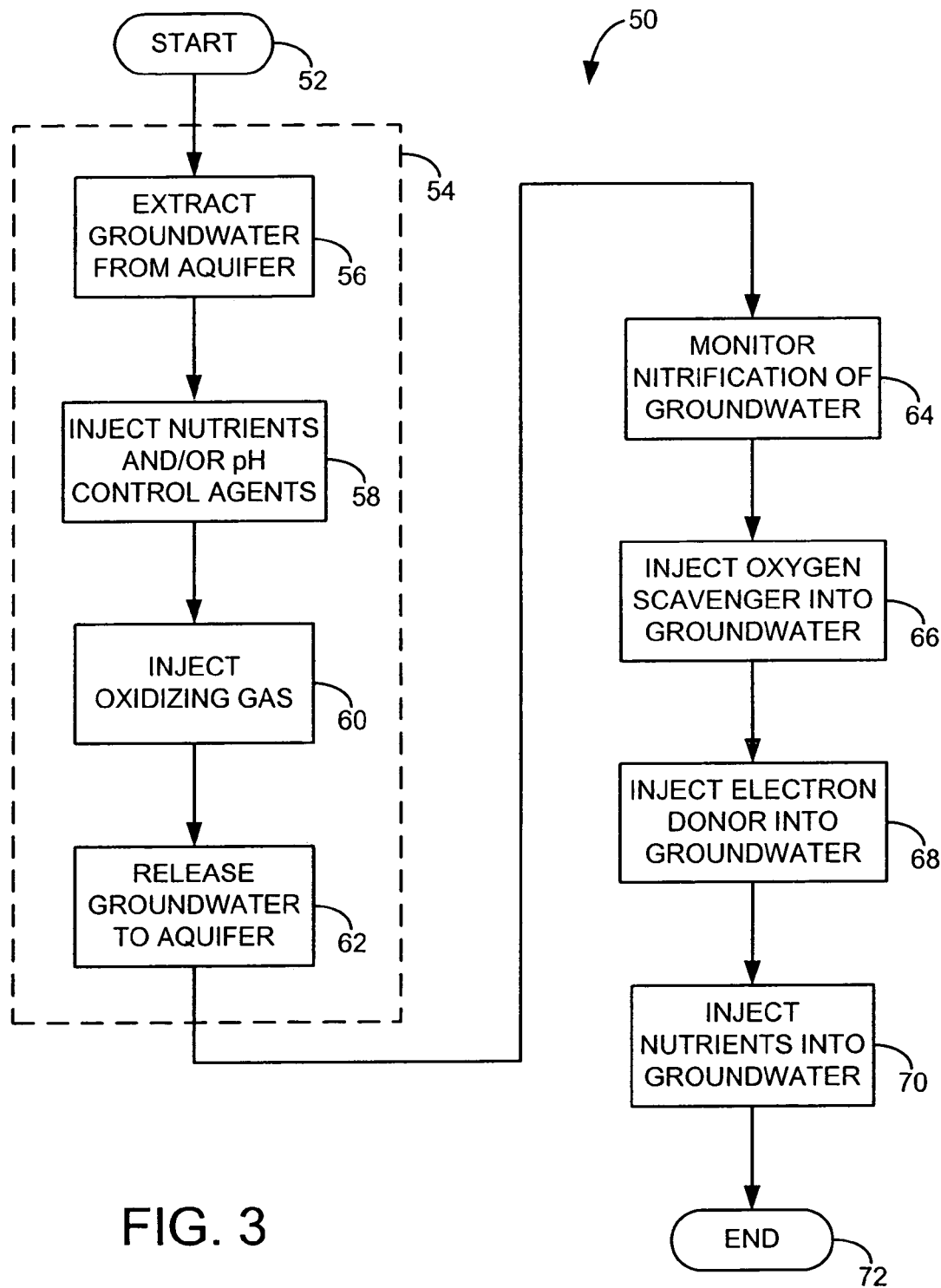
FIG. 3 is a flowchart setting forth the steps of a process for groundwater and soil remediation in accordance with one aspect of the present invention.

Referring now to FIG. 3, the steps of an exemplary groundwater treatment process 50 starts 52 by oxygenating or ozonating the source 54. In particular, oxygenation or ozonation of groundwater 54 is accomplished by pumping groundwater from the aquifer 56. As stated above, this extraction 56 may be to remove the groundwater via a well, but need not actually raise the groundwater above ground. Once the groundwater is extracted 56, the process continues by adding nutrients and pH control agents 58 to the water as needed. In particular, it is contemplated that the pH should be controlled to maintain a range of generally neutral to slightly basic pH levels, for example, 6.8 to 8.5. According to one embodiment, a pH of approximately less than 8.5 is maintained by adding sodium bicarbonate, limestone or the like. In this regard, the pH controller acts as a pH influencer to the pH level of the groundwater in the aquifer. An oxidizing gas is then mixed with the groundwater via a venturi eductor 60 and the groundwater is re-injected back into the aquifer 62.

The nutrients added to the groundwater 58 prior to contact with the oxidizing gas in the venturi eductor 60 can include phosphates and/or a variety of pH control agents. The addition of phosphate at a acidic pH, for example, as low as about 4, advantageously produces more stable $O_2/O_3$ micro-bubbles for injection into the aquifer. This increases the residence time and half-life of the organic/inorganic substrates.

The use of a venturi eductor for mixing groundwater and the oxidizing gas 60, with groundwater as the motive fluid, creates gaseous oxidant micro-bubbles which enhance the aerobic nitrification process of converting ammonia-N to a nitrite/nitrogen. The oxidizing gas can include, for example, atmospheric air, pure oxygen, ozone, mixtures thereof, or the like.

The use of a venturi eductor for gas dispersion is significantly simpler (no moving parts), less expensive, and easier to operate than conventional sintered ceramic diffusers used in traditional treatment systems employing a biological treatment process. Additionally, as stated, this step of dispersing oxidizing gas in groundwater 60 can be implemented to facilitate subsurface chemical or simultaneous chemical and biological oxidation of volatile organic substrates, such as chlorinated organic solvents, or the like.

Once the groundwater has been re-injected into the aquifer 62, the effectiveness of the nitrification process is monitored 64 by analyzing downstream groundwater for nitrate. The nitrates thus formed are converted to elemental nitrogen by adapting the aquifer to anoxic conditions, thereby facilitating denitrification. This is accomplished by deoxygenating the nitrified groundwater in-situ by injecting an oxygen scavenger 66, such as sodium sulfite, and then adding an electron donor 68, such as acetate or lactate. Additional nutrients can also be added to the groundwater to aid denitrificating microorganisms 70. Effective denitrification is achieved by maintaining a desirable molar-electron-to-donor-nitrate ratio (for example, organic-carbon-to-nitrate-weight ratio generally <0.2).

It should be noted that the nutrients are selected to aid in the proliferation of microorganisms within the water source. These microorganisms primarily require nitrogen and phosphorous to thrive. Since the medium being treated is in groundwater contaminated with nitrogen compounds, there is generally no shortage on nitrogen for the microorganisms. However, it may be desirable to add phosphorous in some situations. Specifically, phosphorus may be added to maintain a nitrogen-to-phosphorus (N:P) ratio of approximately 5 to 1.

To optimize nitrification, it is desirable to maintain a low bio-chemical-oxygen-demand-to-total-kjeldahl-nitrogen (BOD5-to-TKN or BOD5:TKN) ratio. In this regard, the present invention recognizes that the BOD5:TKN ratio should be maintained below 0.5. In this regard, since carbonaceous BOD5 is often present in the groundwater, easily biodegradable carbonaceous organic matter, such as acetic acid, lactic acid, or the like may be added to maintain a desired BOD5:TKN ratio.

Nitrification is an aerobic process and requires high dissolved oxygen (DO) in the water. Generally, groundwater under subsurface conditions is low in DO and does not have the a desired BOD5:TKN ratio or a desired N:P ratio. The present invention provides all these elements and maintains such at levels that allow the desired (de)nitrification microorganisms to thrive. As such, the above-described system and process achieve the desired treatment more efficiently than prior art processes.

Figure 4:
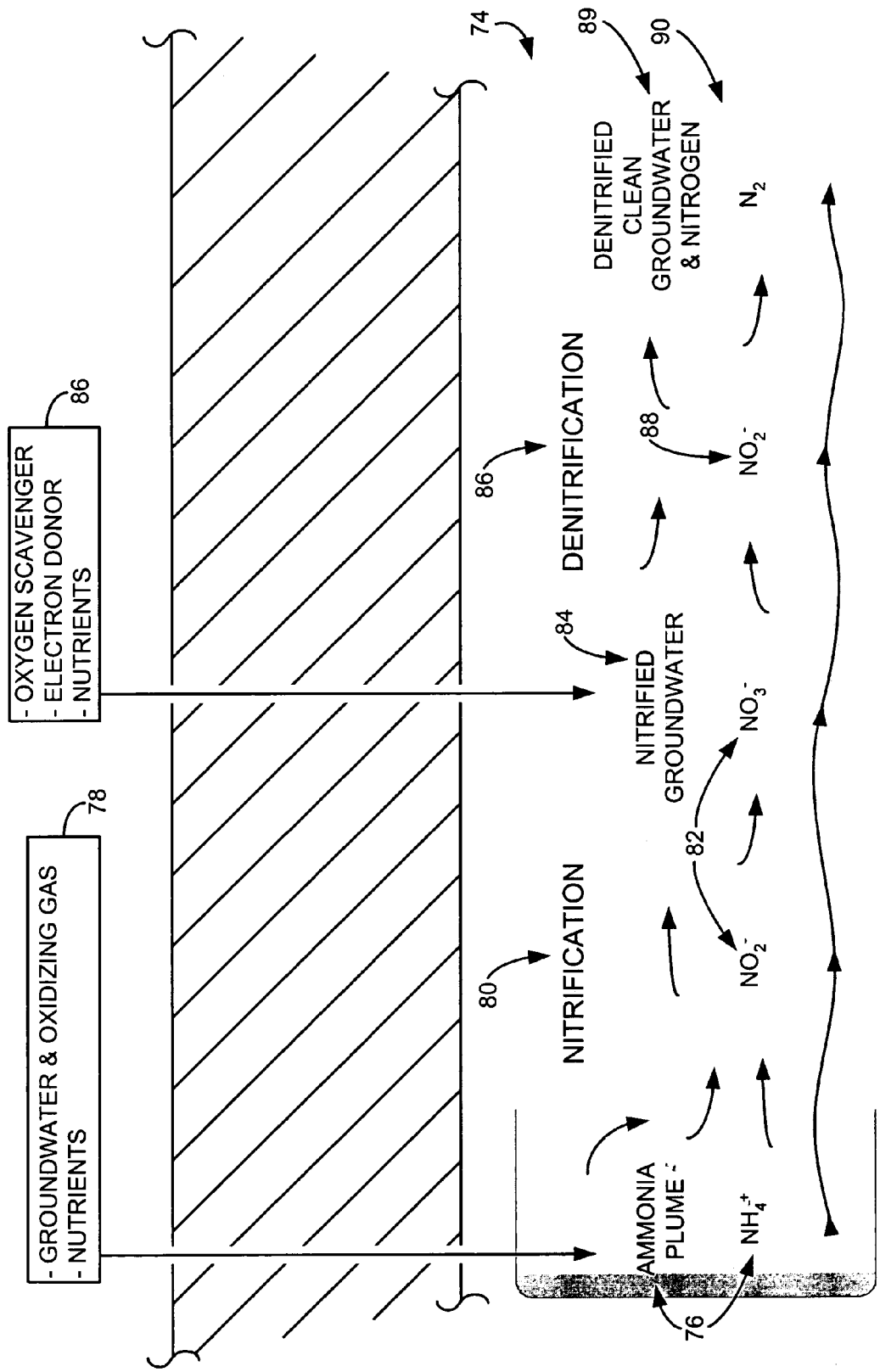
FIG. 4 is a schematic diagram of a remediation process in accordance with the present invention, as applied to an example of a contaminated groundwater system.

Referring now to FIG. 4, the above-described process is shown as applied, for example, to remediate an aquifer 74 including an ammonia plume 76. Water, which may be previously extracted groundwater or water from another source, is combined with oxidizing gas and nutrients 78 and injected into the aquifer 74 including the concentration of ammonia 76 to deaminate the groundwater using a hydrolysis/bacterial decomposition. Accordingly, an aerobic bacterial process causes nitrification 80 and the ammonia 76 is converted 82 ($NH_4^+ \rightarrow NO_2^- \rightarrow NO_3^-$).

An oxygen scavenger, an electron donor, and nutrients 86 are then injected into a now nitrified groundwater 84 to initiate denitrification 86. The anoxic bacterial process of denitrification 86 converts the nitrified groundwater 84 into denitrified clean groundwater 88 and nitrogen 90 ($NO_3^- \rightarrow NO_2^- \rightarrow N_2$).

Therefore, the treatment process generally includes the steps of oxygenating or ozonating the source area, adding nutrients, and maintaining a low bio-chemical-oxygen-demand-to-total-kjeldahl-nitrogen (BOD5-to-TKN or BOD5:TKN) ratio (generally <0.5) to create conditions effective to permit aerobic biological deamination of organic-nitrogen compounds and nitrification of ammonia-nitrogen compounds. Thereafter, the process introduces into the source area an amount of an oxygen scavenger and an electron donor sufficient to maintain a molar-electron-donor-to-nitrate ratio compatible with denitrification.

The above-described invention advantageously allows a groundwater remediation system to be positioned and the process substantially performed underground. Additionally, by using a venturi eductor, the remediation system can be constructed more economically and in a less complicated manner than prior art systems using sintered ceramic diffusers. Similarly, the remediation system incurs less maintenance costs than prior art systems.

The present invention has been described in terms of the preferred embodiments, and it should be appreciated that many equivalents, alternatives, variations, and modifications, aside from those expressly stated, are possible and within the scope of the invention. Therefore, the invention should not be limited to a particular described embodiment. Rather, the scope of the following claims and their equivalents should be considered.

We claim:

1. An in-situ method for denitrifying nitrogen compounds in water, the method comprising the steps of:
   introducing into the water an amount of an oxidizing gas sufficient to nitrify the nitrogen compounds to form nitrates;
   introducing into the water an amount of at least one of an oxygen scavenger and an electron donor in an amount sufficient to deoxygenate the water; and
   introducing into the water at least one of a nutrient and a pH influencer in an amount sufficient to promote growth of denitrifying microorganisms at the site to denitrify the nitrates,
   wherein the nitrification, deoxygenation and denitrification take place substantially underground.

2. The method of claim 1 further comprising the step of maintaining in the water a ratio of biochemical oxygen demand to total kjeldahl nitrogen (BOD5:TKN) below about 0.5.

3. The method of claim 2 wherein the maintaining step includes the step of introducing into the water biodegradable carbonaceous organic matter.

4. The method of claim 3 wherein the biodegradable carbonaceous organic matter comprises at least one of acetic acid and lactic acid.

5. The method of claim 1 further comprising the step of maintaining in the water a nitrogen-to-phosphorus ratio of about 5 to 1.

6. The method of claim 1 further comprising the step of maintaining in the water a pH between a generally neutral pH level and a slightly basic pH level.

7. The method of claim 6 wherein the maintaining step includes the step of introducing into the water at least one of sodium bicarbonate and limestone.

8. The method of claim 1 wherein the step of introducing into the water an amount of at least one of an oxygen scavenger and an electron donor further includes maintaining a molar-electron-donor-to-nitrate ratio compatible with denitrification of the nitrates.

9. The method of claim 1 wherein the step of introducing the oxidizing gas further includes encouraging the denitrifying microorganisms to aerobically deaminate organic nitrogen compounds and to nitrify ammonia nitrogen compounds in the water.

10. A method for denitrifying nitrogen compounds in a water source, the method comprising the steps of:
    pumping water from the water source;
    injecting oxidizing gas through an eductor into the water;
    releasing the water into the water source to nitrify the nitrogen compounds in the water source to form nitrates; and
    injecting into the water source an oxygen scavenger and an electron donor in amounts sufficient to achieve a ratio of molar-electron-donor-to-nitrate sufficiently high to denitrify the nitrates in the water source,
    wherein the nitrification, deoxygenation and denitrification take place substantially underground.

11. The method of claim 10 further comprising the steps of:
    monitoring a concentration of the nitrates; and
    injecting nutrients into the water source in an amount sufficient to enhance denitrification of the nitrates.

12. The method of claim 10 further comprising the step of maintaining in the water a ratio of biochemical-oxygen-demand-to-total-kjeldahl-nitrogen (BOD5:TKN) below about 0.5.

13. The method of claim 10 further comprising the step of maintaining in the water a weight ratio of organic carbon to nitrate of generally less than 0.2.

14. The method of claim 10 wherein the eductor comprises a venturi eductor.

* * * * *